United States Patent
Konovalov et al.

[15] 3,683,220
[45] Aug. 8, 1972

[54] ROTOR FOR AN ELECTRICAL MACHINE

[72] Inventors: Boris Leonidovich Konovalov, 603 mikroraion, I, kv. 346; Vasily Semenovich Kildishev, ulitsa Plekhanovskaya, 41/43, kv. 55; Vadim Borisovich Kaplunov, ulitsa Bairona, 140/34, kv. 45; Vladimir Ivanovich Tokarev, ulitsa 2 Pyatiletki, 23, kv. 35; Boris Volkovich Spivak, ulitsa Kosiora, 56, kv. 55; Boris Ilich Byaly, prospekt Moskovsky, 210/3, kv. 66; Alexandr Abramovich Chigirinsky, ulitsa Kuibysheva, II, kv. 8; Evgeny Khaimovich Glider, prospekt Ordzhonikidze, 18, kv. 55; Oleg Borisovich Gradov, ulitsa Kosiora, 6, kv. I; David Bentsionovich Karpman, ulitsa Frantisheka Krala, 49, kv. 54; Pavel Yakovlevich Kartashevsky, prospekt Moskovsky, 35/I, kv. 22; Ivan Yakovlevich Cheremisov, bulvar Ivana Korkacha, 2, kv. 81, all of Kharkov, U.S.S.R.

[22] Filed: Jan. 8, 1971
[21] Appl. No.: 104,923

[52] U.S. Cl. .................310/183, 310/197, 310/264
[51] Int. Cl. ................................................H02k 3/16
[58] Field of Search......310/183, 197, 201, 210, 211, 310/261, 262, 264, 265

[56] References Cited

UNITED STATES PATENTS

| 2,421,860 | 6/1947 | Winther.............310/210 UX |
| 2,372,590 | 3/1945 | Ljunggren et al...310/210 UX |
| 3,106,654 | 10/1963 | Wesolowski..........310/183 X |
| 3,513,342 | 5/1970 | Saber.......................310/211 |

Primary Examiner—J. V. Truhe
Assistant Examiner—B. A. Reynolds
Attorney—Waters, Roditi, Schwartz & Nissen

[57] ABSTRACT

The present invention relates to electrical machines, and more specifically to rotors with dampers for turbo-alternators.

The invention resides in that in an electrical-machine rotor the dampers are made of a high-conductance material, electrically connected to the rotor core, have teeth of the same shape as the teeth on the rotor core and located in radial annular grooves which are deeper than the slots for the field winding.

3 Claims, 3 Drawing Figures

ROTOR FOR AN ELECTRICAL MACHINE

The present invention relates to electrical machines, and more specifically to turbo-alternator rotors with dampers.

In the prior art, there is a design of the turbo-alternator rotor in which the rotor teeth are electrically interconnected on their sides by short-circuiting rings made of a non-ferromagnetic high-conductance material.

At each end this rotor has an annular groove the outer diameter of which is limited by the bottom of the slots on the rotor and the inside diameter by that of the rotor shaft. Mounted on the rotor shaft are copper or bronze sleeves fitting into said annular grooves under the teeth so that there is electric contact between the sleeve and the undersides of the cut-down teeth.

A disadvantage of this design is that the sleeve (the short-circuiting ring) is placed a rather long distance from the surface of the rotor core where eddy-currents are at their strongest. In completing their path through this sleeve, the eddy-currents have to traverse the steel teeth twice (from top to bottom and from bottom upwards). The obvious increase in resistance on the path of the eddy-currents impairs the efficiency of the short-circuiting damper ring called "a sleeve" in the description of the quoted patent.

An object of the present invention is to avoid this disadvantage.

A particular object of the invention is to provide an electrical-machine rotor in which eddy-currents are removed from the surface of the rotor core effectively.

With these objects in view, the present invention resides in that in the rotor of an electrical machine, notably of a turbo-alternator, having at the ends of the rotor core dampers made of a high-conductance material and electrically connected to the rotor core, the dampers have, according to the invention, teeth of the same shape as those of the rotor core and are located in radial annular grooves which are deeper than the slots for the field winding.

The present invention effectively removes eddy-currents from the surface of the rotor core, reduces local heating at the binding ring, and enables the load to be raised in both asymmetrical and asynchronous operation.

In one of its embodiments, the invention may have a radial annular groove for a damper, milled directly in the rotor core.

In another embodiment of the invention, the radial annular groove for the damper is formed by an end of the rotor core and a ring permanently mounted on the rotor shaft and having teeth of the same shape as the teeth on the rotor core.

It is preferable that the radial annular groove formed by the end of the rotor core and the shaft-mounted ring has unparallel walls.

This embodiment of the invention improves contact between the damper ring and the rotor core provided by centrifugal forces during rotation.

It is preferable that in one of the embodiments of the invention the damper is made in the form of an unsplit ring with a wedge-shaped section the broad side of which faces the smaller diameter.

Thus embodied, the damper ring is a replica of the radial annular groove in one of the embodiments of the invention and has an increased area of electric contact with the rotor core.

It is equally preferable to build up the damper of several segments wedge-shaped in section, the broad side of which faces the smaller diameter, while the segments are electrically interconnected by locking wedge.

This enables the damper to be installed in the radial annular groove milled in the rotor core and its segments to be electrically connected into a ring.

In a preferred embodiment of the invention, the segments of the damper are wedged out at each tooth of the rotor core, which improves electric contact between the damper and the rotor core.

The invention will be more fully understood from the following description of preferred embodiments of the invention when read in connection with the accompanying drawings wherein.

Figure 1:
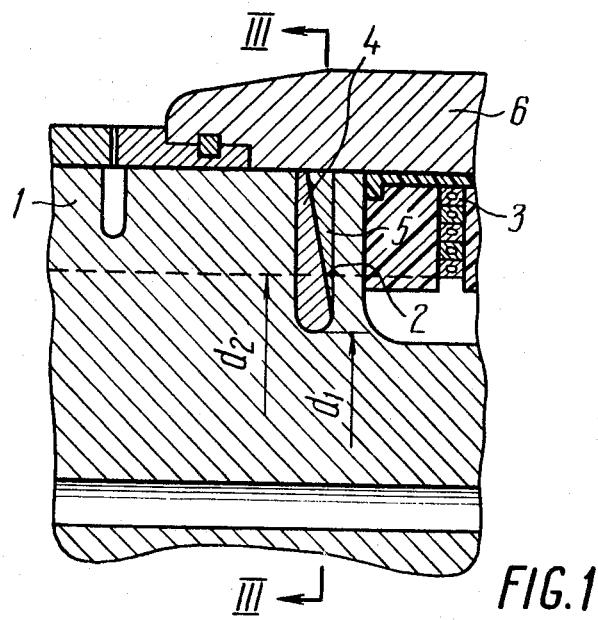
FIG. 1 shows a damper in a radial annular groove milled directly in the rotor core.
Figure 3:
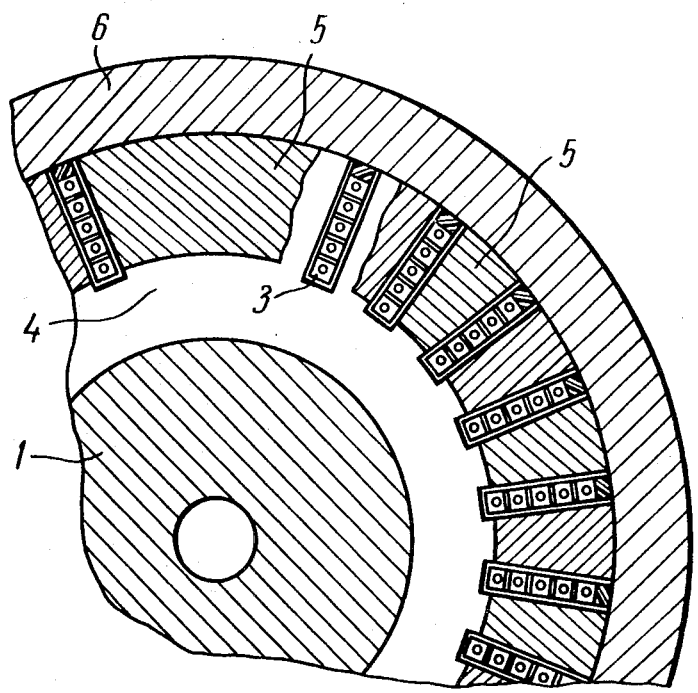
FIG. 3 is section III—III of FIG. 1.

Referring to FIGS. 1 and 3, there is a rotor core I in which is milled a radial annular groove 2 with an inside diameter $d_1$ which is smaller than the diameter $d_2$ between the bottoms of the slots for the field winding 3. This radial annular groove 2 accepts a damper 4 which is made of a high-conductance material, such as copper, wedge-shaped in section and built up of two or more segments. Each segment of the damper 4 is of the same shape as the teeth of the rotor. The damper 4 is held to the sides of the teeth by locking wedges 5 made of the same material as the damper. Apart from holding the damper to the teeth of the rotor core, the locking wedges 5 interconnect the segments of the damper 4 at the joints. At the top, the damper 4 and the locking wedges 5 bear upon a binding ring 6, either directly or through an insulating spacer (not shown in the drawings).

Figure 2:
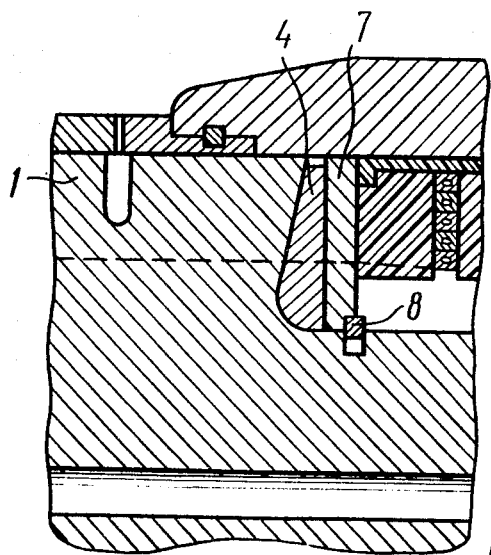
FIG. 2 shows a damper in a radial annular groove formed by an end of the rotor core and a ring mounted on the rotor shaft, at the end of the rotor core.

In a second embodiment of the invention the damper 4 is placed in an annular groove formed between an end of the rotor core I (FIG. 2) and a ring 7. The ring 7 and the damper 4 are each made integral, with slots milled in them just opposite the slots in the rotor core and serving to pass the field winding.

The end of the rotor core I and the side of the damper 4 are made tapering so that when the damper moves radially under the action of centrifugal forces, the damper 4 is held to the sides of the teeth in the rotor core I with a greater force.

The ring is prevented from moving axially by a key 8.

What is claimed is:

1. An electrical-machine rotor, particularly for a turbo-alternator or the like, comprising: a core having slots, said core further having annular grooves in the end face portion thereof; a field winding located in the slots of said core; annular dampers made of a high-conductance material and having cut-outs in the form of slots, said dampers being located in said annular grooves; said damper being formed of a plurality of segments wedge-shaped in transverse cross-section and widening in the direction towards the inner diameter thereof, and locking wedges retaining said segments against the walls of said groove while electrically interconnecting said segments.

2. An electrical-machine rotor, particularly for a turbo-alternator or the like, comprising: a core having slots; a field winding located in the slots of said core; annular dampers made of a high-conductance material and having cut-outs in the form of the slots of the rotor core to accommodate the field winding, an annular slot receiving said dampers, said dampers being electrically associated with the rotor core, said annular groove for the damper being formed by the end face of the rotor core, and a ring permanently mounted on the rotor shaft and having teeth of the same shape as the teeth of the rotor core.

3. An electrical-machine rotor as claimed in claim 2, wherein the annular groove for said damper has unparallel walls.

* * * * *